April 16, 1968  R. B. KROITOR  3,377,719
GLOBE NAVIGATION SIMULATOR

Filed Dec. 3, 1964  5 Sheets-Sheet 1

Inventor
Roman B. Kroitor
By Cushman, Darby & Cushman
Attorneys

April 16, 1968 R. B. KROITOR 3,377,719
GLOBE NAVIGATION SIMULATOR
Filed Dec. 3, 1964 5 Sheets-Sheet 2

Inventor
Roman B. Kroitor
By Cushman, Darby & Cushman
Attorneys

April 16, 1968 R. B. KROITOR 3,377,719
GLOBE NAVIGATION SIMULATOR
Filed Dec. 3, 1964 5 Sheets-Sheet 3

Inventor
Roman B. Kroitor
By Cushman, Darby & Cushman
Attorneys

April 16, 1968  R. B. KROITOR  3,377,719
GLOBE NAVIGATION SIMULATOR
Filed Dec. 3, 1964  5 Sheets-Sheet 4

Inventor
Roman B. Kroitor
By Cushman, Darby & Cushman
Attorneys

April 16, 1968  R. B. KROITOR  3,377,719
GLOBE NAVIGATION SIMULATOR
Filed Dec. 3, 1964  5 Sheets-Sheet 5

Inventor
Roman B. Kroitor
By Cushman, Darby & Cushman
Attorneys

United States Patent Office 3,377,719
Patented Apr. 16, 1968

3,377,719
GLOBE NAVIGATION SIMULATOR
Roman B. Kroitor, 3538 Marlowe Ave.,
Montreal, Quebec, Canada
Filed Dec. 3, 1964, Ser. No. 415,674
Claims priority, application Canada, Oct. 6, 1964,
913,326
8 Claims. (Cl. 35—46)

This invention relates to planetary globes and apparatus for demonstrating navigation over and above the planet's surface.

In classical geographic globes it is customary to mount the globe for rotation about the north-south axis and to provide at least one pair of gimbals to provide rotation of the globe's north-south axis about a further axis in the plane of the equator. Such classical globes do not permit the tracing or following of navigational paths along selected great circle routes which do not coincide with equatorial or meridianal paths. Further, with such known geographic globes, whilst it is commonly possible to rotate the globe about the north-south axis and one or more perpendicular axes in order to bring a portion of the earth's surface into a convenient viewing position, no convenient means are usually provided for measuring, in any selected direction, the great circle distances between various points on the globe's surface.

This invention has particular utility in tracing various routes, particularly great circle routes, on the surface of a planet, or corresponding routes taken by aircraft or satellites and the like.

The invention contemplates the mounting of a planetary globe in such a way that the globe rotates about two mutually perpendicular axes. The invention further includes at least one drive motor which is adapted, to engage, via a friction wheel, the globe at a selected great circle. The provision of a second drive motor and an associated friction wheel driving on another great circle where the second great circle lies in a plane at right angles to the first-mentioned great circle enables the globe to be rotated along a component path which path lies on a great circle lying in a plane differing from the two mutually perpendicular great circles associated with the two drive motors.

It is a feature of this invention to provide a simple motor drive for a planetary globe for instruction in navigation.

It is another feature of this invention to provide means for suspending a planetary globe whereby the said globe is free to rotate about at least two perpendicular axes simultaneously.

It is another feature of this invention to provide a planetary globe which is suitable for use as an animated advertising display.

It is yet another feature of this invention to provide a planetary globe of sufficiently simple and inexpensive construction as to be suitable for use as a toy or an educational device.

It is yet another feature of this invention to provide a planetary globe having electric drive means and means for measuring distances travelled on great circles between selected points on the surface of said globe.

It is yet another feature of this invention to provide means for indicating the approximate amount of fuel remaining in an aircraft or ship or other vehicle navigating between selected points on the surface of a planetary globe.

It is yet another feature of this invention to provide a simple and inexpensive game wherein those taking part in the game may compete to find which player can navigate between selected points on the surface of a planetary globe in the most efficient manner or with the lowest fuel consumption.

By a broad aspect of the invention there is provided a globe navigation simulator comprising: a planetary globe having three mutually perpendicular diametral axes, a support base, a plurality of driven rotatable support means carried by said base, said support means permitting simultaneous rotation of said globe about a selected two of said axes, and, position indicator means connected to said base, said position indicator being located adjacent the surface of said globe and serving an observer to follow navigational courses when said globe is rotated.

A preferred embodiment of the invention will now be described with reference to the accompanying drawings wherein.

Figure 1:
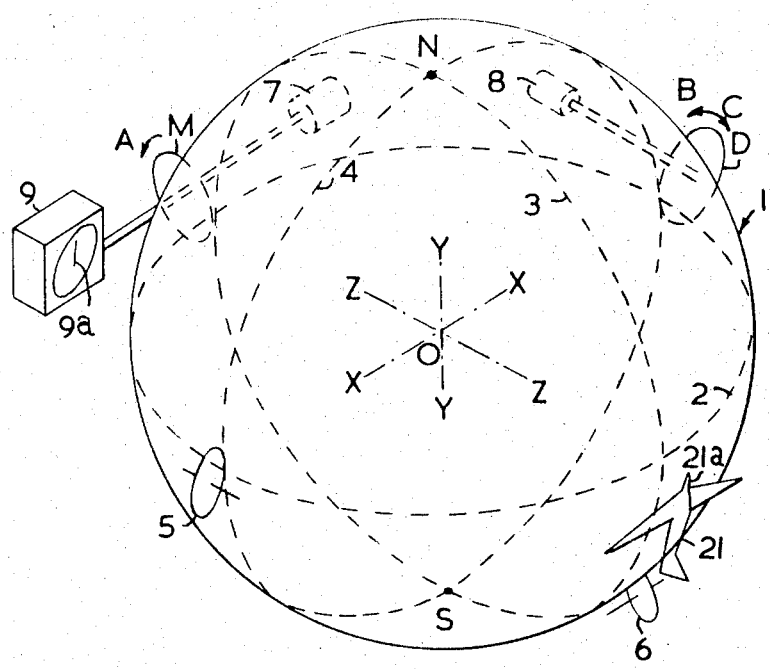
FIG. 1 is a highly simplified diagram showing a globe mounted for rotation about two axes perpendicular to one another, said globe having electric drive means for rotating the said globe about each of said axes simultaneously.

Referring to FIG. 1 there is shown a globe represented by a circle 1 and the globe has an equator 2 and meridians 3 and 4 where meridians 3 and 4 cross one another at the north, N, and south, S, poles, as shown. The globe axis Y—Y corresponding with the north-south axis of rotation, and meridian 3 is formed about axis X—X, and meridian 4 is formed about axis Z—Z. Axes X—X, Y—Y, and Z—Z are mutually perpendicular.

The globe 1 is supported by a Mileage friction wheel M, a Direction wheel D, an idler wheel 5, and a castoring wheel 6. The castoring wheel 6 contacts the meridian 3 at point southernly of the equator 2, in the position of the globe as shown, so that the globe is restrained against moving out of contact with wheels M, D and 5. Idler wheel 5 may be spring loaded towards the surface of the globe in order to maintain the Direction wheel D, which is located diametrically opposite, in frictional engagement with the surface of the globe. Mileage friction wheel M is shift driven from a motor 7 and the axis of Mileage wheel M is parallel with axis X—X of the globe. Mileage wheel M is in frictional contact with the globe along meridian 3. Direction friction wheel D is shaft driven by a motor 8 and the axis of direction friction wheel D is parallel with axis Z—Z of the globe. The direction friction wheel D, in the position shown, is in frictional contact with meridian 4. Mileage friction wheel M is also connected to a mileage indicator 9 having a pointer 9a, the mileage indicator being discussed hereinafter. For simplicity the supports for the various wheels and motors shafts etc., are not shown in this drawing. There is shown at 21 a vehicle position marker in the form of an aircraft and in the position in which the globe is shown in FIG. 1 the nose of the aircraft is immediately above the interception of the equator 2 and meridian 3. In operation, if motor 7 is energized to drive mileage friction wheel M in the direction shown by arrow A then the globe will rotate solely about axis X—X pivoting on its point of contact with wheel D and idler wheel 5 and the nose of the aircraft will appear towards the north pole along meridian 3.

If, on the other hand, motor 8 is energized to drive direction friction wheel D in an anti-clockwise direction as shown by arrowhead B, the globe will rotate about axis Z—Z pivoting on its point of contact with wheel M and a diametrically opposite point which is unsupported, and the direction of the aircraft 7 will change direction, to port, relative to meridian 3.

If now both motors 7 and 8 are energized simultaneously the aircraft will appear to move along a curved path wherein the curvature of said path will be dependent upon the relative speeds of the motors 7 and 8. In true navigation about the surface of the earth, an aircraft or ship would not normally be continuously changing directions so that the mileage friction wheel M would normally be driven continuously whilst direction friction wheel D would be intermittently driven in order to change the direction of the aircraft or ship in order to maintain the vehicle on the selected course, which course would normally be on a great circle.

Figure 2:
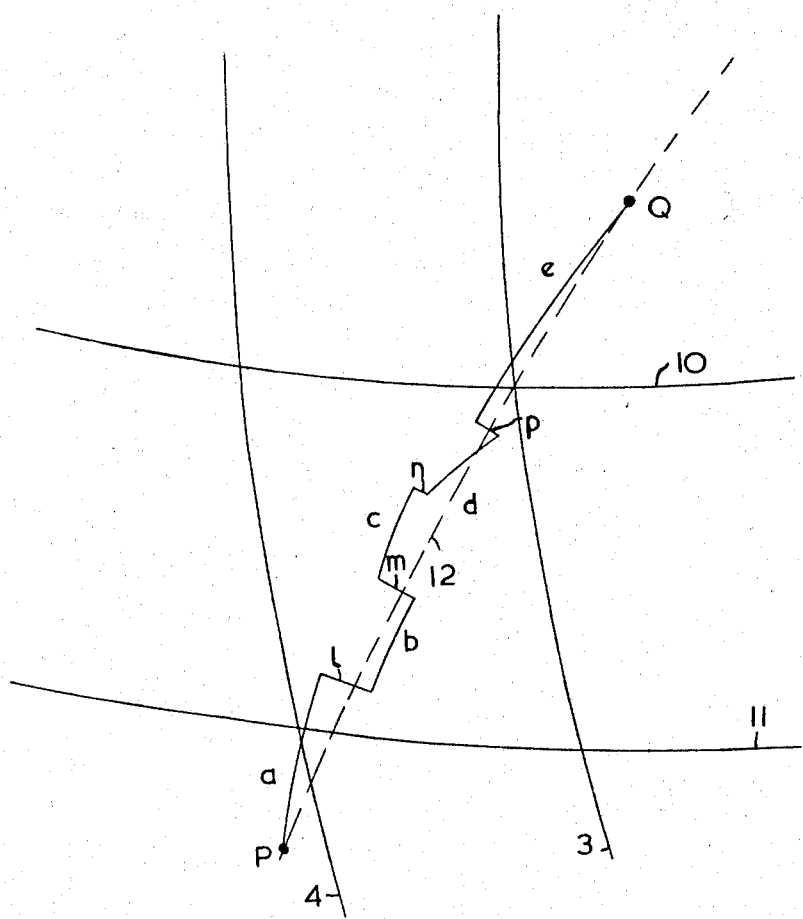
FIG. 2 is a diagram of a typical simulated path of an aircraft or other vehicle.

Referring now to FIGURE 2, there is shown a portion of the surface of a globe, said portion including meridians 3 and 4 and two parallels of latitude 10 and 11. Also shown is a desired route 12 extending from position P to position Q. A vehicle starting from point P could have an initial error in direction causing the vehicle to take a path designated by $a$ and after proceeding a certain distance along the $a$ path, which is not coincident with the great circle, a correction is made by turning to starboard and proceeding along a short path 1 which, in the example shown here, takes the vehicle beyond the desired great circle path 11. The remainder of the desired route is made up of paths $b$, $c$, $d$ and $e$ together with corrective paths $m$, $n$ and $p$. Correlating this actual path, with its various changes of direction, with the apparatus shown diagrammatically in FIGURE 1, it will be seen that after completing path $a$ the vehicle is turned to starboard by rotating Direction wheel D in a clockwise direction. Similarly after completing path 1 the vehicle is turned to port in readiness for completing path $b$, this requiring a rotation of Direction wheel D in an anti-clockwise direction. In the illustration shown in FIGURE 2 the vehicle is turned at the discreet points located at the junction points of $a$ and 1, 1 and $b$, $b$ and $m$, $m$ and $c$, $c$ and $n$, $n$ and $d$, $d$ and $p$, and $p$ and $e$. At these junction points motor 8 is energized briefly for making the appropriate turn to port or starboard. At all other times the mileage wheel M is rotated steadily by motor 7 at a speed appropriate to the velocity of the vehicle concerned. The means for changing the speed of motor 7 will be discussed hereinafter.

Referring again to FIGURE 1 the mileage indicator 9 which includes an indicator 9a is driven from the same shaft as that joining mileage wheel M with motor 7. Rotation of mileage wheel M therefore rotates indicator 9a in proportion with the number of turns of mileage wheel M and therefore the path on the globe over which mileage wheel M traverses. It will be appreciated that the contact between mileage wheel M and the surface of the globe is substantially point contact so that the reading of the mileage indicator 9 is accumulative without regard to the changes of direction of the vehicle, under the influence of direction wheel D, throughout a total path traversed on the surface of the globe.

Figure 3:
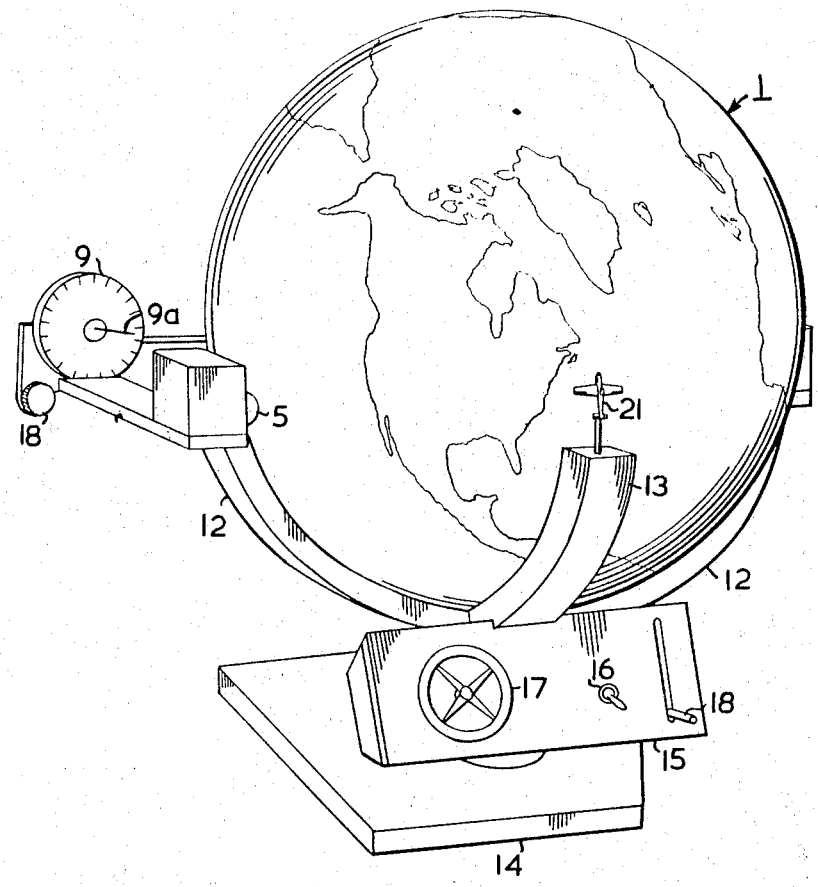
FIG. 3 shows a globe complete with support and drive members.

Referring now to FIGURE 3 there is shown the globe 1 mounted for rotation in a frame consisting of arcuate members 12 and 13. The arcuate members 12 and 13 are suitably mounted on a base plate 14 which plate also carries a panel 15 incorporating a main switch 16 incorporating a direction wheel 17 and a speed control 18. Direction control 17 controls motor 8 and speed control 18 controls motor 7.

Figure 3A:
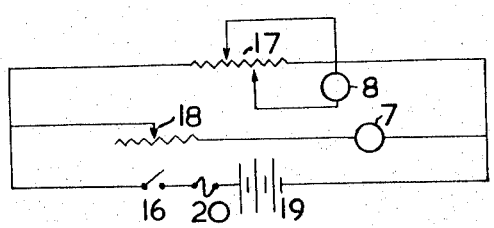
FIG. 3a is a simplified wiring diagram.

FIGURE 3a shows a suitable wiring diagram for the present invention. It will be seen that the control 17 for motor 8 comprises a double slider rheostat 17 which enables not only the speed of motor 8 to be varied but also the direction of rotation. Distance motor 7 is controlled by resistance 18 adapted only to change the speed of the motor 7. Power is supplied from any suitable source as, for example, battery 19 and the on-off switch 16 and fuse 20 completes the circuit.

Figure 4:
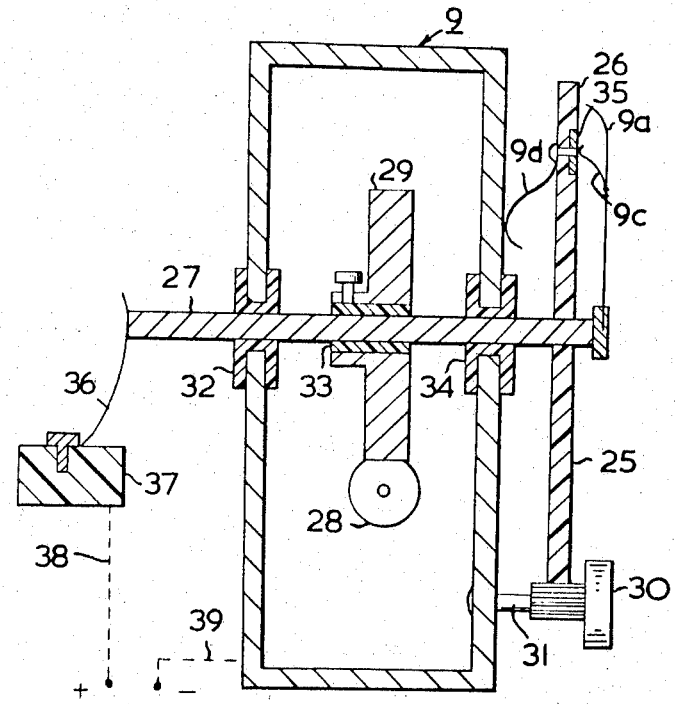
FIG. 4 shows details of distance-travelled indicator.
Figure 4A:
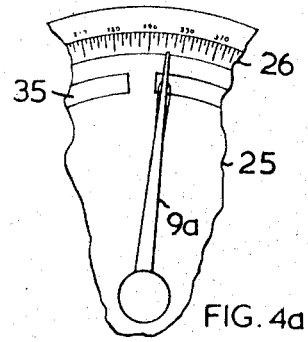
FIG. 4a shows a portion of the dial on the distance-travelled indicator.

Referring now to FIGURE 4 there is shown, in highly simplified form, one embodiment of a mileage indicator for use with the planetary globe. The mileage indicator, generally indicated at 9, includes a circular dial 25 having indicia on the surface thereof as at 26. A shaft 27 carries pointer 9a and the shaft is driven via a worm 28 and wormwheel 29, where the worm 28 is driven from motor 7.

The position of dial 25 may be reset by rotation of setting knob 30 which is frictionally retained on stub shaft 31 which is fixed to the indicator case 9. The knob 30 may be rotated in order to set the position of dial 25 and the dial 25 will stay in this position until knob 30 is again rotated. By suitable choice of the diameter of mileage wheel M, as shown in FIGURE 1, the pitch of worm 28, and the number of teeth on worm-wheel 29 the indicia 26 may be adapted to read, directly, miles traversed, or conversely miles remaining to complete a given trip.

Figure 4B:
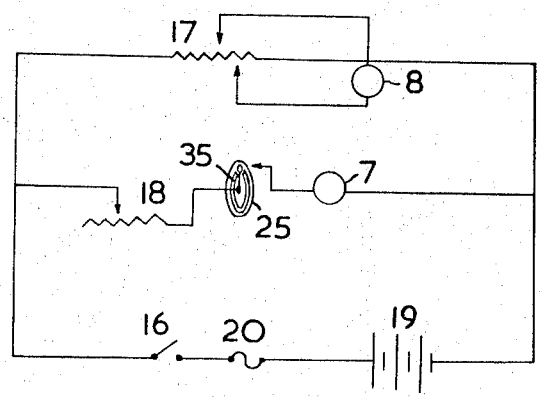
FIG. 4b shows a modified wiring diagram.
Figures 4C, 4D:
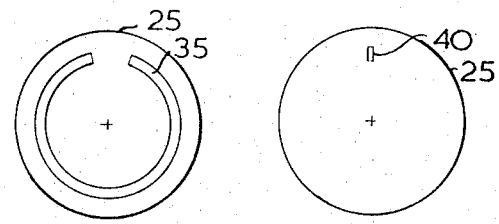
FIG. 4c shows a modified contact for the mileage indicator shown in FIG. 4.
FIG. 4d shows an alternative dial contact.

Referring again to FIGURE 4, there may be also provided means whereby the shaft 27 is electrically insulated from the indicator case 9, by bushings 32, 33 and 34. If the dial 25 is of an electrically insulative material then the setting knob 30 or stub shaft 31 may comprise an insulating material. The dial 25 has recessed, into the surface thereof, a contact rim 35 which extends for nearly 360 degrees, as shown in FIGURE 4c. The rim 35 is engaged by a springy contact 9c carried by the pointer 9a, and a further contact 9d is adapted to engage the outer surface of the indicator case 9 by means of a further springy contact 9d. A further springy contact 36 suitably mounted on a frame member 37 makes contact with the remote end of the shaft 27. It will be seen therefore that an electrical path exists from the terminals marked plus and minus respectively through a circuit consisting of dotted lines 38, 39, contact 36, shaft 27, pointer 9a, contacts 9c and 9d, and the case 9. Current will flow through this circuit whenever contact 9c is opposite a portion of the rim 35, but as shown in FIGURE 4c, the current will be interrupted whenever the contact 9c is positioned off the rim 35. A suitable wiring diagram is shown in FIGURE 4b where it will be seen that the circuit just discussed can be used to interrupt the supply of electrical power to the motor 7 after the mileage indicator has turned through a selected angle, the angle being previously determined by rotation of the selection knob 30. The mileage indicator 9 may, alternatively, be calibrated in terms of fuel, so that it may be used to indicate the amount of fuel used during a trip or the amount left from that quantity with which the trip was started. The original amount may be set by setting knob 3, and the amount left at any time indicated by the position of points 9a.

Figure 4E:
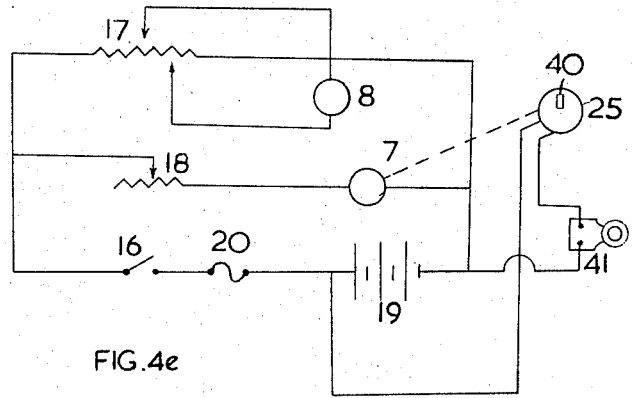
FIG. 4e shows a further wiring diagram.

If it is desired that the electrical power supply to motor 7 not be interrupted by the contact 9c, the same contact 9c may be used in conjunction with a modified dial as shown in FIGURE 4d wherein instead of a rim extending substantially 360 degrees of arc, there is a contact 40 having a short length of arc. In all other respects the elements shown in FIGURE 4 are necessary. However, in this further embodiment should it be required that an alarm or other indicator be used to indicate when a certain mileage has been completed, then the circuit shown in FIGURE 4e may be used. Here the dial 25 with its short arc contact 40 is used to control an alarm indicated at 41, and it will be appreciated that the remaining parts of the circuit are identical with that shown in FIGURE 3a.

In operation the operator will establish a desired course by rotation of control wheel 17 until a desired reaction is obtained. Either concomitantly or subsequently the speed lever or control 18 may be advanced to give a surface speed appropriate to the vehicle being represented. In the case of aircraft navigation and ship navigation it will usually be necessary to plan a trip which involves intermediate calls at ports or airfields for the usual commercial reasons and/or for refueling purposes. Apart from the planning of a trip and appropriate courses to give desirable great circle navigation, the invention provides an excellent means whereby the most economic flight or ship schedules may be developed and further enables the operator to visualize and compute distances involved in flying or steaming from widely separated points on the surface of the earth, such trips involving avoidance of alien territory and other undesirable areas.

Apart from the uses mentioned above in commercial applications the present invention may be used as an educational device for the instruction in geography, world commerce, and shipping and flight scheduling.

The invention may be further used as a game for adults and children. When used as a game, one object of the game could be a competition to see which player can navigate between two widely separated places on the surface of the earth in the most efficient manner. Such navigation could include intermediate stops at various ports or airfields and the globe could be suitably marked with places where refueling may be accomplished. Such refueling stations could be chosen well away from desired navigational paths and the players would be faced with the problem of deciding which refueling points represented the least interference with the desired navigational path.

Two other game possibilities should be mentioned; the simulation of satellite orbits, and the exploration of the earth's moon and of other planets, as it becomes possible to make globes of these with proper surface markings. It should also be mentioned that the invention could be applied in a public amusement device, installed in such places as amusement arcades, fairs, expositions and so on.

It will be appreciated that the invention need not be limited to the use of a globe of the earth the invention being equally applicable to other planets and natural planetary satellites, such as the earth's moon, and the novel support conveniently enables globes of various planets to be interchanged at will.

The embodiments of the invention in which an exclusive property or privilege is claimed are defined as follows:

1. A globe navigation simulator comprising:
   (i) a planetary globe;
   (ii) a support base;
   (iii) a pair of driven rotatable support means carried by said base, the axes of rotation of each of said rotatable support means being mutually perpendicular and fixed relative to said support base, said axes lying on a diametral plane of said planetary globe, further support means carried by said base and including one support means located diametrically opposite one of said driven rotatable support means, said globe being supported for free movement on said driven and further support means and being maintained in position on said support means by gravity, said pair of driven rotatable support means being in frictional engagement with the surface of said planetary globe at points on said diametral plane disposed 90° from each other as measured from the center of said globe for rotating the globe;
   (iv) a first drive means operatively connected to one of said driven rotatable support means;
   (v) a second drive means connected to another of said driven rotatable support means, said first and second drive means adapted to be operated independently, simultaneously and sequentially;
   (vi) position indicator means connected to said base, said position indicator being located adjacent the surface of said globe and serving an observer to follow navigational courses when said globe is rotated.

2. A globe navigation simulator comprising:
   (i) a planetary globe;
   (ii) a support base;
   (iii) a pair of driven support wheels carried by said base, each of said support wheels being rotatable about respective axes, the axes of rotation of said support wheels being mutually perpendicular and fixed relative to said support base, said axes lying on a diametral plane of said planetary globe, further support wheels covered by said base and including one support wheel located diametrically opposite one of said driven support wheels, said globe being supported for free movement on said driven and further support wheels and being maintained in position on said support wheels by gravity, said pair of driven support wheels being in frictional engagement with the surface of said planetary globe at points on said diametral plane disposed 90° from each other as measured from the center of said globe;
   (iv) a first drive motor operatively connected to one of said driven support wheels;
   (v) a second drive motor connected to another of said driven support wheels, said first and second drive motors adapted to be operated independently, simultaneously and sequentially;
   (vi) position indicator means connected to said base, said position indicator being located adjacent the surface of said globe and serving an observer to follow navigational courses when said globe is rotated.

3. Apparatus in accordance with claim 2 wherein said drive motors are electric motors, and further including:
   (i) a source of electric power connected to said motors,
   (ii) a first control means for adjusting the speed of said first drive motor, and,
   (iii) second control means for adjusting both the speed and direction of rotation of said second drive motor.

4. Apparatus in accordance with claim 3 further including a distance-travelled indicator driven by said first drive motor.

5. Apparatus in accordance with claim 4 wherein said distance-travelled indicator includes indicia, a pointer, and intermediate gearing providing a selected number of degrees of rotation during one complete rotation of said globe about a diametral axes of said globe.

6. Apparatus in accordance with claim 5 wherein said distance-travelled indicator further includes electrical contacts for interrupting the supply of electrical power to said first drive motor when a selected indicated distance-travelled has been effected.

7. Apparatus in accordance with claim 5 wherein said distance-travelled indicator further includes electrical contact means, an electric alarm, said contact means activating said alarm when a selected distance has been travelled.

8. Apparatus in accordance with claim 5 including adjustment means for setting said pointer relative to said indicia.

References Cited

UNITED STATES PATENTS

| 648,117 | 4/1900 | Stubblefield | 35—46 |
| 2,957,252 | 10/1960 | Pain | 35—46 |
| 3,003,257 | 10/1961 | Madden | 35—43 |
| 3,058,239 | 10/1962 | Madden | 35—46 |
| 3,070,792 | 12/1962 | Neasham | 35—46 X |
| 3,243,897 | 4/1966 | West | 35—46 |
| 2,431,847 | 12/1947 | Van Dusen | 35—46 |

JEROME SCHNALL, *Primary Examiner.*